United States Patent [19]
Earp et al.

[11] 3,721,987
[45] March 20, 1973

[54] SIGNAL TAPERING AT RECEIVER

[75] Inventors: Charles William Earp, London; Martin Brandon, Harlow, both of England

[73] Assignee: International Standard Electric Corporation, New York, N.Y.

[22] Filed: July 28, 1971

[21] Appl. No.: 166,853

[30] Foreign Application Priority Data

Aug. 5, 1970 Great Britain..................37,729/70

[52] U.S. Cl..........................................343/113 DE
[51] Int. Cl..............................................G01s 3/54
[58] Field of Search..............................343/113 DE

[56] References Cited

UNITED STATES PATENTS 3,613,096  10/1971  Earp......................343/113 DE

Primary Examiner—T. H. Tubbesing
Attorney—C. Cornell Remsen, Jr. et al.

[57] ABSTRACT

This invention relates to a receiver in which the received signal is tapered in synchronism with the motion of a swept antenna at the transmitter. A triangular waveform, having twice the repetition frequency of a square wave emerging from an F.M. discriminator, is generated.

4 Claims, 2 Drawing Figures

Inventors
CHARLES WILLIAM EARP
MARTIN BRANDON

SIGNAL TAPERING AT RECEIVER

BACKGROUND OF THE INVENTION

This invention relates to radio directional guidance systems based on the Doppler principle.

Proposals have been made by the present applicants in recent applications to commutate a radio frequency source successively to the separate elements of a linear horizontal or vertical array of radiators, either to simulate unidirectional constant velocity motion of a single radiator, or to-and-fro constant velocity motion, and in co-pending application Ser. No. 869,527, filed Oct. 27, 1969, now U.S. Pat. No. 3,613,096 the principle of tapering of the radiated energy was introduced for the purpose of avoiding the effects of phase discontinuities between successive sweeps. In that application it was disclosed that tapering could be effected not only at the transmitter but also within the receiver, either in place of, or so as to supplement, tapering at the transmitter.

SUMMARY OF THE INVENTION

It is an object of the present invention to provide circuit means at a receiver of a Doppler radio directional guidance system whereby the received signal may be tapered in suitable manner.

According to a broad aspect of the invention, there is provided a receiver for a radio guidance system wherein signals are radiated sequentially from an antenna array at the transmitter, said receiver comprising an F.M. discriminator for producing a square wave from the alternations of received side bands from said antenna array and means for deriving a symmetrical triangular wave from said square wave for modulating said received signal.

The above and other objects of the present invention will be more clearly understood from the following detailed description taken in conjunction with the accompanying drawings in which:

DESCRIPTION OF THE PREFERRED EMBODIMENT

Figure 1:
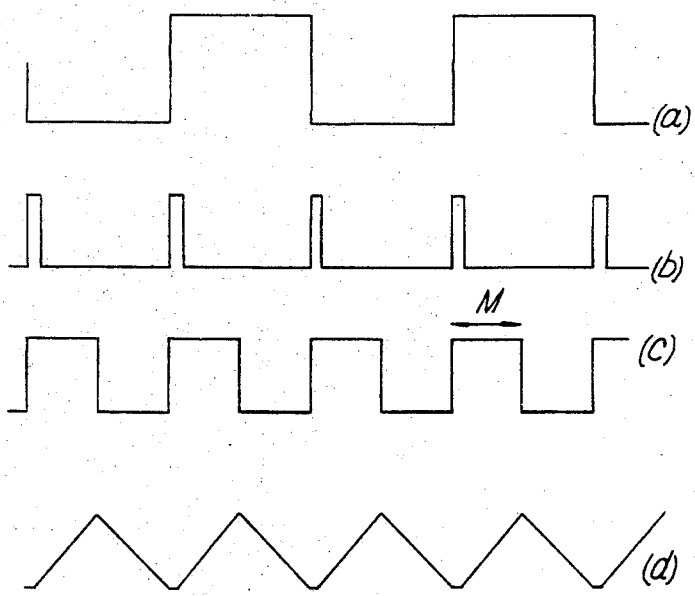
FIG. 1, (a) to (d), shows a series of waveforms employed in the receiver.
Figure 2:
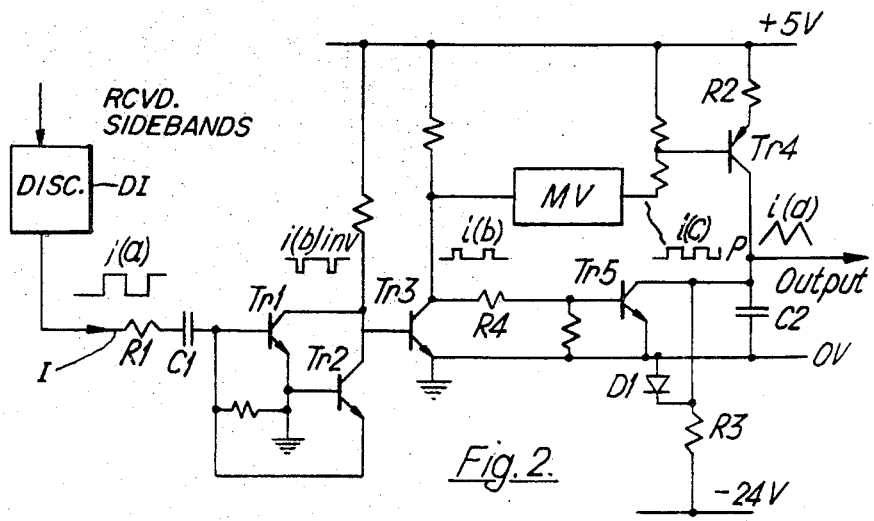
FIG. 2 shows circuit details of a portion of a receiver for effecting linear tapering of a receiver signal.

A square wave, waveform (a) of FIG. 1, may be produced by a conventional FM discriminator DI from the alternation of the received sidebands from a commutating antenna array as the radiating transmitter is traversed linearly along the array. The signal from the discriminator is applied to the circuit of FIG. 2 at the left-hand end at input I and flows via the short-time-constant network of R1 and C1 to NPN transistors Tr1 and Tr2, one of which responds to the rising edges of waveform (a) of FIG. 1 and the other to the falling edges to produce the inverse of the short pulse waveform (b) of FIG. 1 at the common collector outputs of these transistors.

The signal at this point is then applied to NPN transistor Tr3 which both amplifies the waveform and inverts it to the form shown in waveform (b) of FIG. 1. This signal appears at the collector output of Tr3 and is applied to a conventional monostable multivibrator MV which has had its time constant adjusted to be equal to one-half the duration of the original square wave at I (and thus of the commutating frequency at the transmitter), whereby the output of the multivibrator is a second symmetrical square waveform, (c) of FIG. 1, of double the frequency of the square wave from the FM discriminator. The reference M in FIG. 1 waveform (c) represents the pulse length of MV.

The waveform (C) of FIG. 1 at the output of MV is applied to PNP transistor Tr4, which, in combination with capacitor C2, acts as an integrator to produce the symmetrical triangular waveform (d) of FIG. 1 at the collector of Tr4. The most positive portion of waveform (c) of FIG. 1 opens Tr4, as a switch, to cause current to flow to the negative 24 volt line shown, via resistor R3, charging C2 and giving rise to a substantially linear fall of potential on C2, while the succeeding negative portion of waveform (c) of FIG. 1 closes Tr4, and the potential on C2 rises linearly, so giving rise to the triangular waveform.

Since the junction point P of Tr4 and C2 is floating, it is convenient to stabilize this at zero by means of the further transistor Tr5, which responds to the waveform (b) 1, applied via resistor R4, to connect this point P to the Ov line once every cycle of waveforms (c) or (d). This is not an essential feature, however.

Diode D1 is a protection diode to prevent full application of the negative 24v line to the transistors in case of a malfunctioning of the circuit.

The output from point P may be used directly to modulate the receiver gain exactly in phase with the scanning of the transmitting antenna array.

It may be desirable to clip the peaks of the triangular waveform output. It is not essential to have linear tapering, and the triangular waveform output may be passed through a suitable non-linear device to obtain a non-linear receiver gain modulation. The word triangular as used herein is intended to mean generally triangular without necessarily implying linear rise and fall slopes. Where such linearity is intended, it is so specified.

It is to be understood that the foregoing description of specific examples of this invention is made by way of example only and is not to be considered as a limitation on its scope.

We claim:

1. In a Doppler radio guidance system including a ground station having a linear antenna array swept to transmit energy from a transmitter substantially from one point along the length thereof at any one time, according to a program including successive energization in at least one direction along said array length to produce a Doppler component and also including an airborne receiving arrangement for evaluating said Doppler component to determine at least one of the bearing and elevation angles relating to the spatial position of said airborne receiving arrangement with respect to said ground station, the combination comprising;

means within said airborne receiving arrangement for receiving said ground station transmitted energy and including an F.M. discriminator for producing a square wave from the alternations of received sidebands from said antenna array;

and means for deriving a substantially symmetrical triangular wave from said square wave, thereby to produce a signal useful for controlling the receiver gain at said airborne receiving arrangement to be minimum at times corresponding to energizing of end elements of said array.

2. Apparatus according to claim 1 in which the elements of said array are substantially linearly spaced and said triangular wave is defined as having substantially linear rise and fall slopes.

3. A system according to claim 1 further comprising:
means for deriving from said square wave emerging from said discriminator a second square wave having twice the repetition frequency of said square wave; and integrating means for deriving from said second square wave said triangular wave.

4. A receiver according to claim 3 further comprising means for deriving from the square wave emerging from said discriminator a succession of short pulses having the repetition frequency of said square wave for resetting said integrator to a zero point.

* * * * *